Sept. 1, 1964  R. J. TUBB  3,147,320
CARBURETTORS
Filed Dec. 11, 1961  7 Sheets-Sheet 5
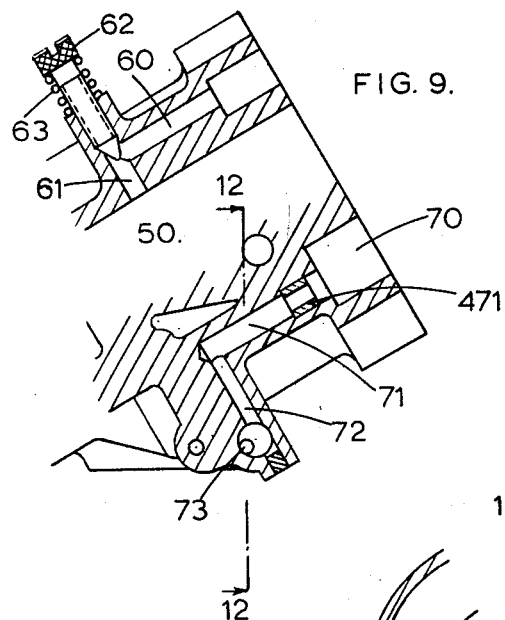
FIG. 9.
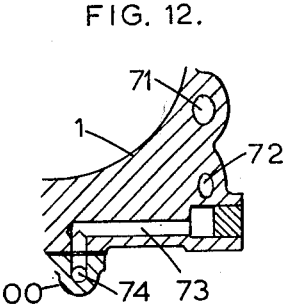
FIG. 12.
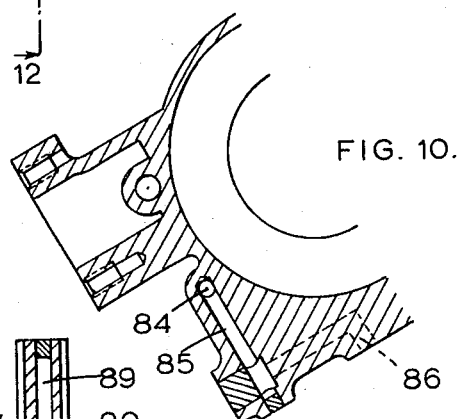
FIG. 10.
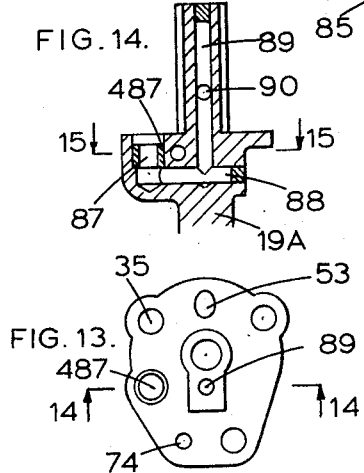
FIG. 14.
FIG. 13.
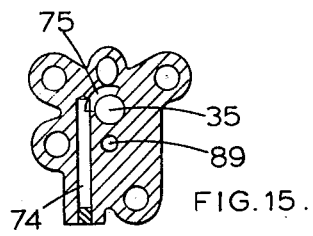
FIG. 15.
INVENTOR
REGINALD JOHN TUBB
BY Irwin S. Thompson
ATTY.

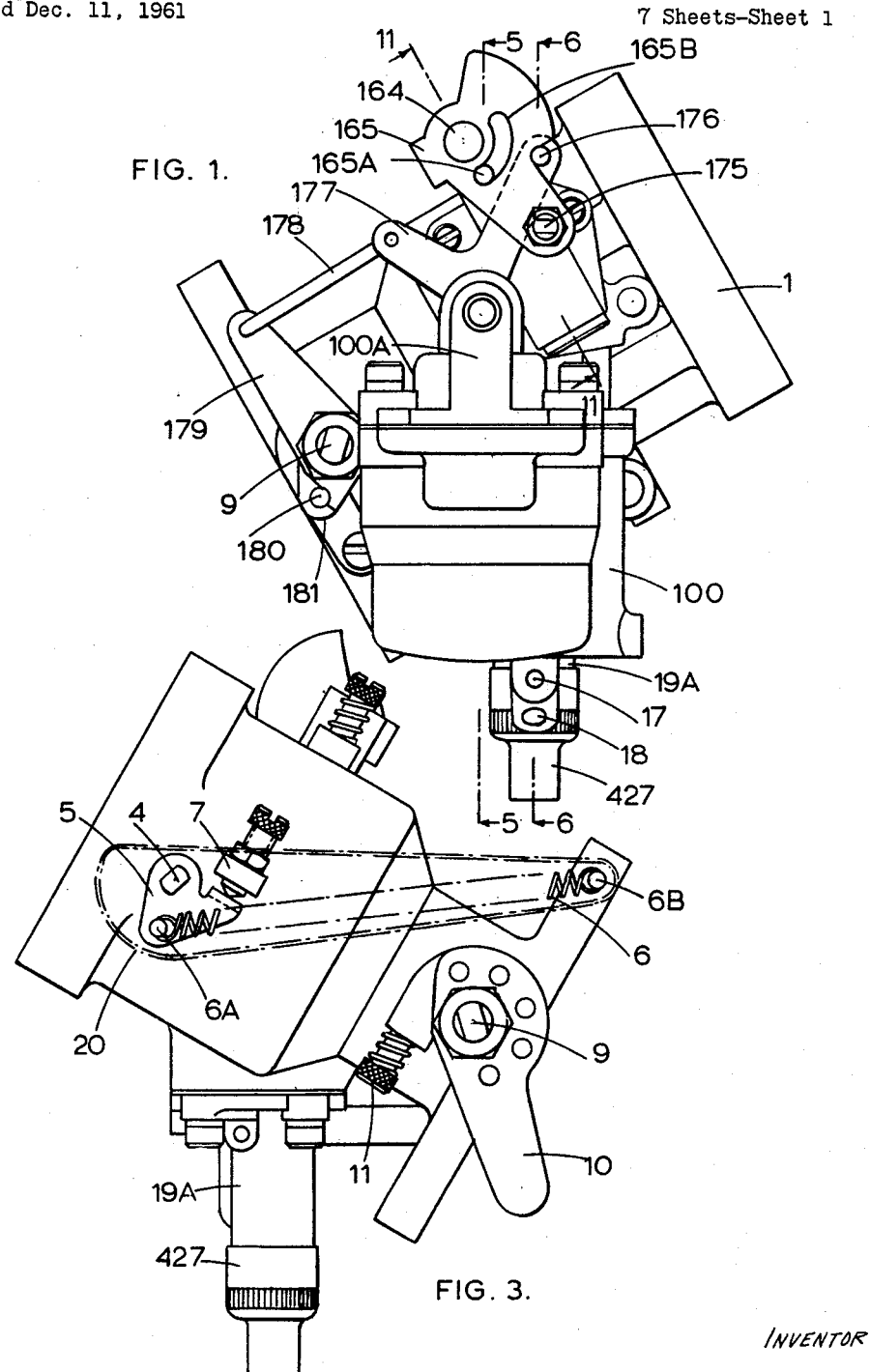

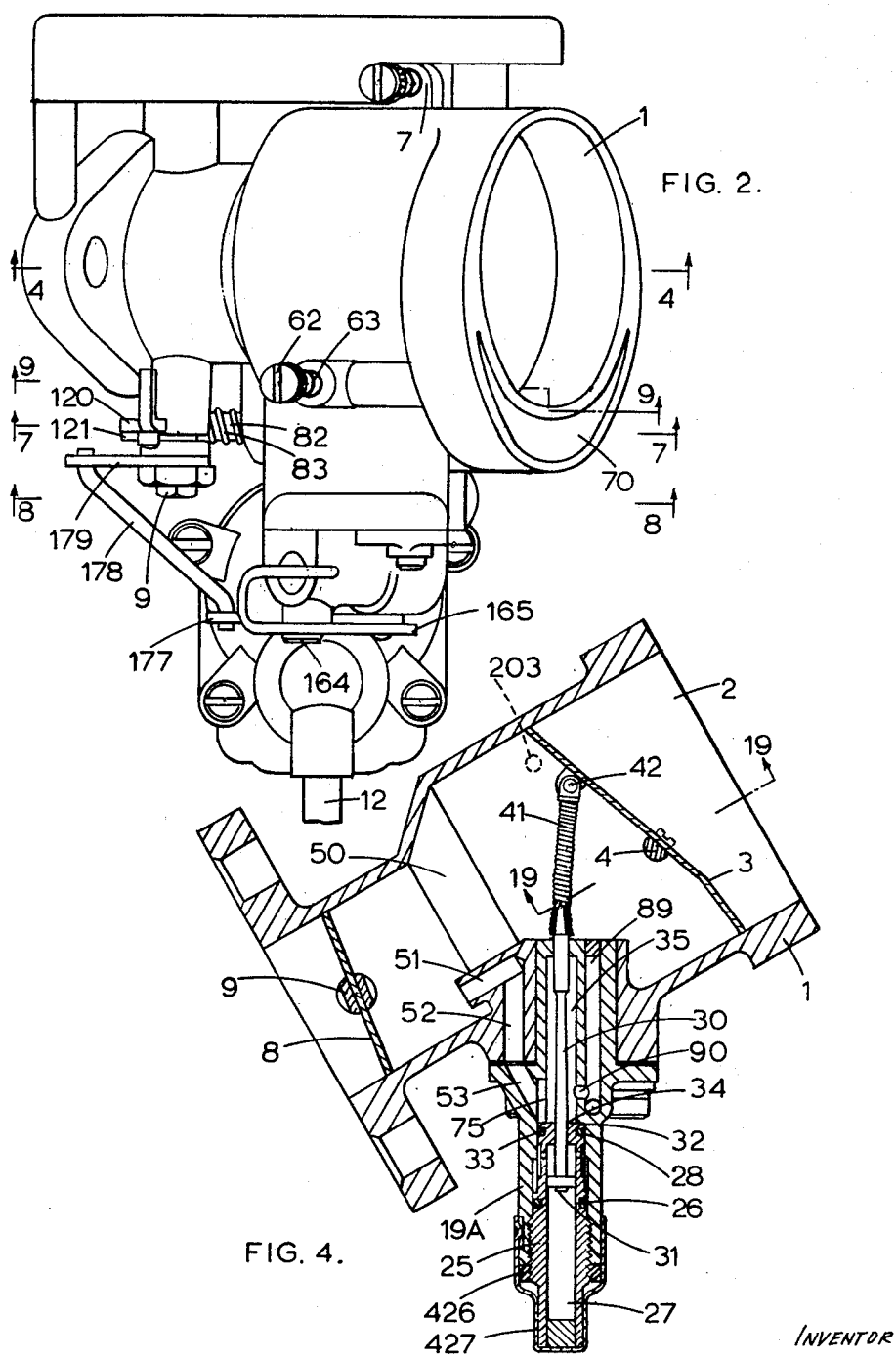

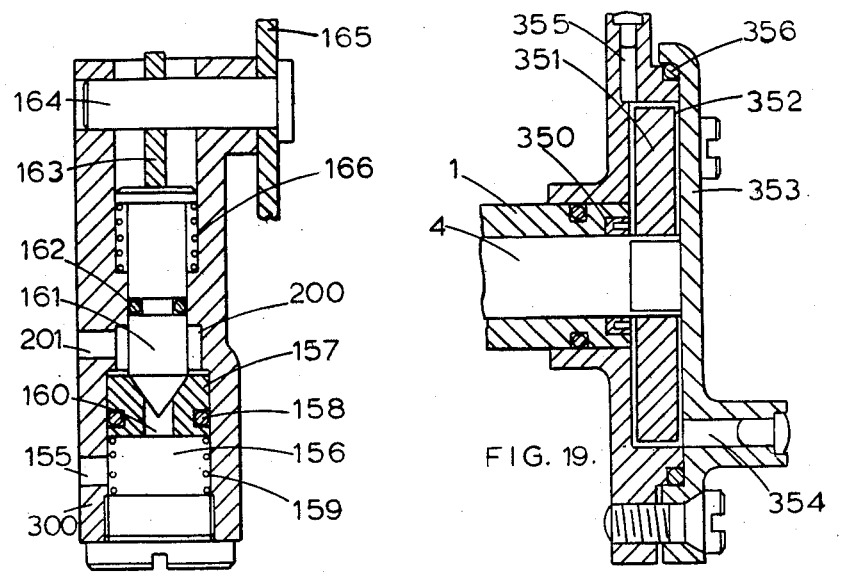

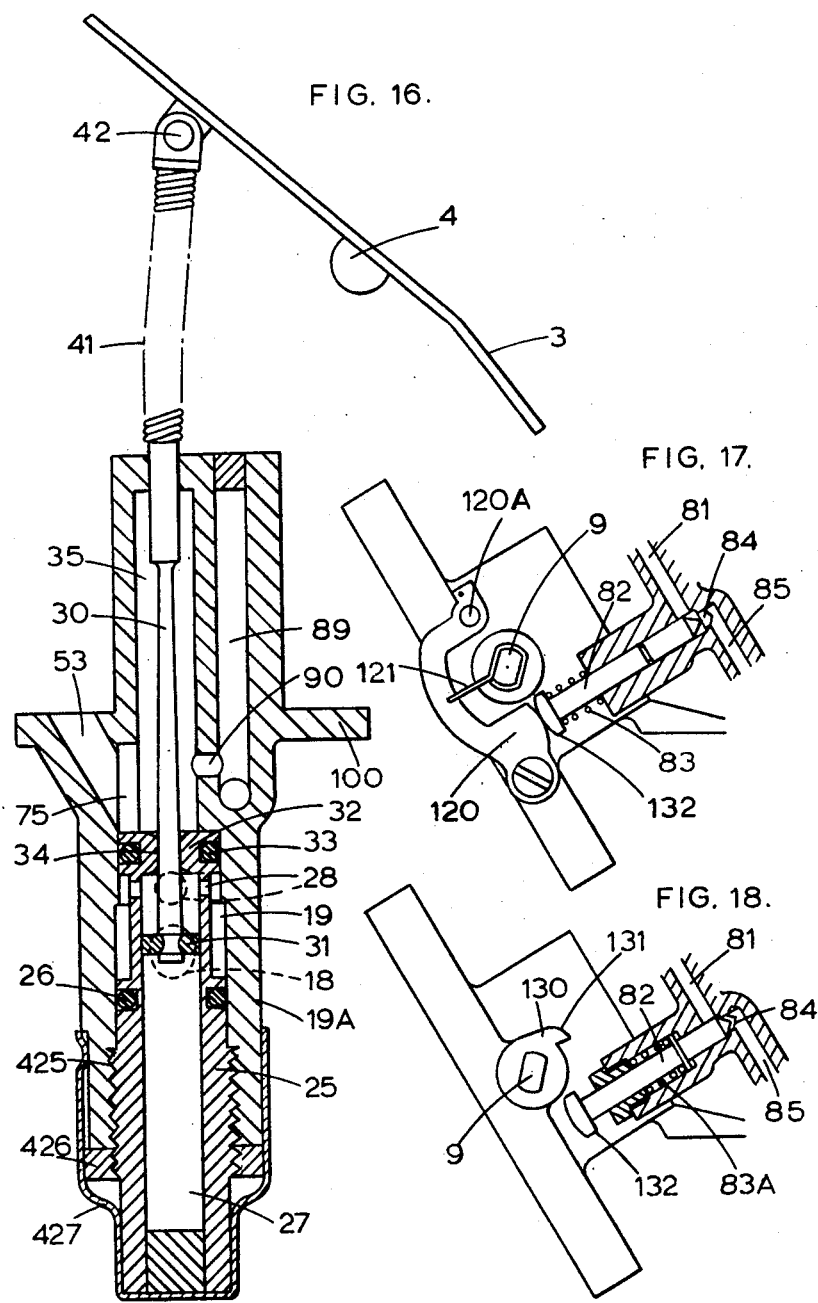

3,147,320
CARBURETTORS
Reginald John Tubb, Leighton Buzzard, England, assignor to Engineering Research and Application Limited, Dunstable, England
Filed Dec. 11, 1961, Ser. No. 158,202
Claims priority, application Great Britain May 16, 1961
2 Claims. (Cl. 261—51)

This invention relates to carburettors for supplying fuel/air mixture to internal combustion engines, said carburettors being of the kind having a fuel/air mixing chamber, a throttle valve on the intake side of the mixing chamber for controlling air flow to the mixing chamber, and air/fuel mixture control valve member on the outflow side of the mixing chamber, and means for controlling supply of fuel from a float chamber to the mixing chamber. The mixing chamber is a suction chamber as the gas pressure existing in this chamber is lower than atmospheric pressure. This suction controls the supply of fuel to the mixing chamber and increases with increasing opening of the throttle valve. This results in increasing inefficiency of operation of the engine with increasing throttle opening due to the fact that the engine is drawing its air intake from a mixing chamber in which a low pressure exists.

The main object of the present invention is to provide means of durable but simple construction for metering the fuel.

According to one aspect of the present invention we provide a carburettor having an air/fuel mixing chamber and a fuel metering valve device which controls supply of fuel to said chamber, which device is actuated by connection to a mixture control valve member the position of which is governed by the air flow into said mixing chamber, the valve member being urged towards its closed position by yielding means whereby the pressure in the mixing chamber varies with varying air flow to said mixing chamber at a predetermined rate, and ducting is provided to lead fuel to the mixing chamber adjacent the valve member for use during starting of the engine, said ducting being controlled by a fuel valve connected with a starter control device which also actuates the throttle valve whereby on starting the fuel valve and the throttle valve are opened sufficiently for starting.

According to a further aspect of the invention there is provided a carburettor having an air/fuel mixing chamber and a fuel metering valve device which controls supply of fuel to said chamber, which device is actuated by connection to a mixture control valve member the position of which is governed by the air flow into said mixing chamber, the valve member being urged towards its closed position by means of a force applying element acting through means for reducing the closing force applied to said member as the latter opens, whereby the pressure in the mixing chamber increases with increasing air flow to said mixing chamber, and ducting is provided to lead fuel to the mixing chamber adjacent the valve member for use during starting of the engine, said ducting being controlled by a fuel valve connected with a starter control device which also actuates the throttle valve whereby on starting the fuel valve and the throttle are opened sufficiently for starting.

The valve member may be a pivotally mounted flap valve connected by links and/or levers to the fuel metering valve. The fuel metering valve device may be one or more needle valves.

A large suction may be applied during idling of the engine so that the metering effect will not be critical in relation to the level of the fuel in the float chamber.

If desired, a fuel supply opening may be provided entering the mixing chamber near the valve member so as to be controlled by the valve member as this opens so that opening of the valve member reduces the suction acting on the opening to produce a weakening of the fuel/air mixture as the airflow increases.

A constructional form of the invention will now be described with reference to the accompanying diagrammatic drawings, wherein:

FIGURE 1 is a side elevation of a carburettor made in accordance with the invention;

FIGURE 2 is a plan view thereof;

FIGURE 3 is a side elevation on the side remote from that shown in FIGURE 1;

FIGURE 4 is a sectional view on plane 4—4 on FIGURE 2;

Figure 5:
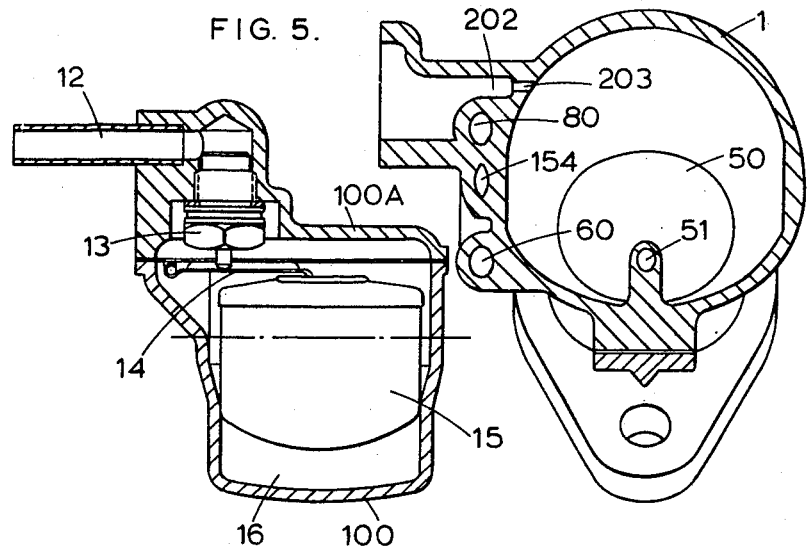
Figure 6:
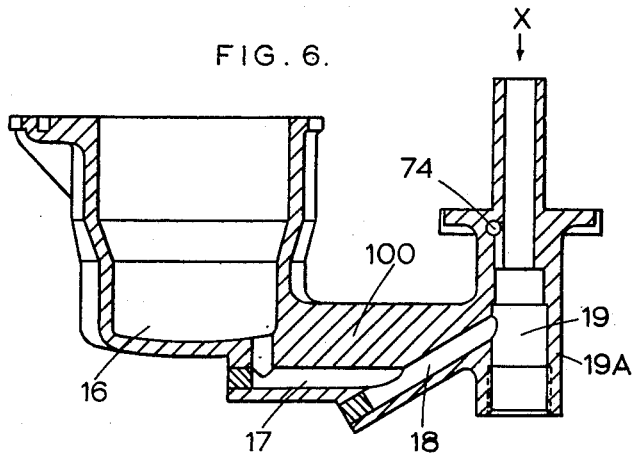
Figure 7:
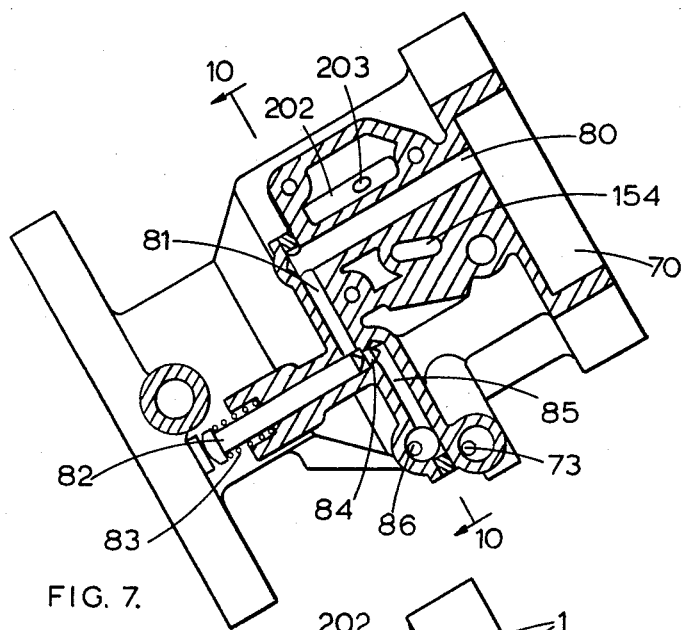
Figure 8:
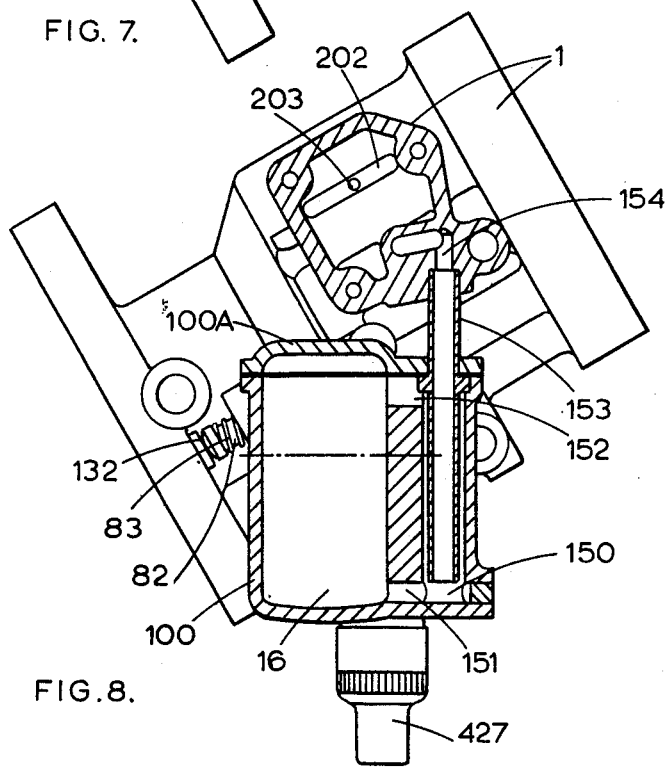

FIGURES 5 and 6 are sectional views on planes 5—5 and 6—6 respectively on FIGURE 1;

FIGURES 7, 8 and 9 are sections taken respectively on planes 7—7, 8—8 and 9—9 on FIGURE 2;

FIGURE 10 is a sectional view on the plane 10—10 on FIGURE 7;

FIGURE 11 is an enlarged part section on plane 11—11 on FIGURE 1;

FIGURE 12 is a sectional view on plane 12—12 on FIGURE 9;

FIGURE 13 is a part view looking in the direction of the arrow X on FIGURE 6;

FIGURE 14 is a part section on the plane 14—14 on FIGURE 13;

FIGURE 15 is a view on the plane 15—15 on FIGURE 14;

FIGURE 16 is an enlarged view of part of FIGURE 4;

FIGURES 17 and 18 show alternative constructions of a part shown in FIGURE 7; and FIGURE 19 shows an alternative construction of a damper applied to the air valve vane and is a sectional view taken on plane 19—19 on FIGURE 4.

The carburettor consists of two main parts, a body 1 and a combined float chamber and emulsion body 100, fitted with a cover 100A. Air is admitted through the body 1 through an opening 2 in which a vane 3 is pivoted to the body on a spindle 4. The spindle 4 carries on the outside of the body a lever 5 controlled by a force applying element in the form of a spring 6 which urges the vane 3 towards its closed position. The lever 5 acts as a force transmitting element to transmit the force of spring 6 to the spindle 4 and vane 3. The lever 5 is controlled by an adjustable stop 7. The lever 5 and spring 6 are covered by a shield 20. The spring is fixed at one end to a pin 6A on the lever and is fixed at its other end to a pin 6B on the body. In the closed position of the vane 3, the radius 4 to 6A is less than a right angle to the axis of the spring 6 so that increasing displacement of the lever 5 in the opening direction results in a reduced torque on the spindle 4.

The amount of air and fuel mixture passing through the carburettor is controlled by a throttle valve 8 mounted on a spindle 9 carried by the body. The spindle 9 carries a control lever 10 on the outside of the body, the control lever 10 being fitted with an adjustable stop 11 which registers with a suitable abutment (not shown).

The vane 3 will tend to open to an increasing extent with increasing opening of the throttle valve 8 thereby admitting a greater airflow to the mixing chamber whence it flows past the valve 8 to the engine. The spindle 4 is disposed offset from the centre line of the opening 2 so that airflow opens the vane 3. As the airflow into the carburettor is increased the air pressure acting on vane 3, by virtue of the offset disposition of spindle 4, will produce a torque on said spindle tending to open it against the restoring torque provided by spring 6. In opening, the vane 3 will expose a reduced area thereof to the incoming air tending to reduce the opening torque, with the result that said vane will come to rest in a stable position, when the opening torque is balanced by the restoring torque due to spring 6.

It will be seen that as the vane 3 opens the angular position of the lever 5 varies so as to vary the closing force on the vane 3 thereby varying the suction in the mixing chamber in a predetermined relationship with the airflow to the mixing chamber. As shown, the pressure in the mixing chamber will increase with increasing opening of the vane 3.

It is an important aspect of this invention that the pressure in the mixing chamber is made to increase with increasing opening of the vane 3.

Fuel enters the carburettor via a pipe 12 and a needle valve 13 controlled by a lever 14 under the influence of a float 15 in a float chamber 16 in the body 100. Fuel in the chamber 16 passes via drillings 17, 18 (FIGURE 6) into a chamber 19 in a tubular member 19A. Located within the member 19A is a tubular housing 25, which is sealed to the tubular member 19A by means of a rubber seal 26. The housing 25 contains a chamber 27 in which slides a needle 30 carrying a piston 31, concentrically within a jet member 32 that carries a rubber seal 33. The relationship between the jet 32 and the needle 30 is adjusted by means of a screw thread 425 (FIGURE 16) on housing 25 which co-operates with a thread in tubular housing 19A, the assembly of housing 25 and tubular member 19A being secured by a locking ring 426 and protected by a sealing cap 427.

Fuel enters the chamber 27 from the chamber 19 via drillings 28 and fills chamber 27 above piston 31 and leaves via the annular orifice 34 between the jet member 32 and the needle 30 into a chamber 35 in the body 100, whence it passes into a quadrant shaped space 75 (FIGURE 15) via drillings 53, 52, 51 into the fuel-air mixing chamber or suction chamber 50 in the body 1, which chamber lies between the vane 3 and the throttle valve 8. The needle 30 is connected by a plunger 40, flexible coupling 41, pivot 42 to the vane 3. The position of vane 3 controls the area of the fuel orifice 34 according to its position within the opening 2 of the body 1. The degree of taper provided on the needle 30 controls the relationship between the space formed between the vane 3 and the opening 2 and the area of the fuel orifice 34. The flexible coupling 41 may be a helically wound Phosphor bronze wire.

Further control of the fuel is afforded by bleeding air into the fuel at a position between the metering orifice 34 and the mixing chamber 50. This is effected by ducting comprising drillings 71, 72, 73 connected by an opening 70 (FIGURES 2 and 9) formed in the body 1, which communicates with passages 71, 72, 73 in body 1 and passage 74 (FIGURE 15) in the float chamber body 100. The passage 71 may preferably contain a calibrated orifice member 471. The passage 74 communicates in turn with the quadrant shaped space 75 which is in connection with the chamber 35 and passages 51, 52, 53.

The possibility that wear may occur on the edges of vane 3 and/or spindle 4 and cause a leak of air is important when said vane is in a closed position and is unimportant when said vane is in an open position. Rather than to alter the relationship between vane 3 and orifice 34 an adjustably controlled air by-pass is provided by a passage 60 formed in body 1 and communicating with the air opening 70 (FIGS. 1 and 9) leading through passage 61 into the chamber 50, flow of air through said passages 60 and 61 being adjusted by means of a needle valve member 62 which is prevented from moving under the influence of vibration by means of a spring 63.

If it is desired to control further the ratio of fuel/air, for example to provide enrichment or weakening at any throttle position, further air bleeding to the chamber 35 (i.e. between the fuel metering orifice 34 and the mixing chamber 50) is provided through passages 80 and 81 communicating with the air opening 70 in the body 1 (FIGURE 7), which passages are controlled by a needle valve member 82 carrying a return spring 83 and co-operating with a seating 84. Said seating in turn communicates through a passage 85, 86 (see also FIG. 10) with passage 87 (which passage may contain a calibrated orifice member 487) and passage 88 in the tubular member 19A (FIGURE 14) and 89, the fuel entering the chamber 35 via drilling 90 (FIGURE 16). In a modification shown by FIG. 17, the needle valve 82 is controlled according to the throttle position by means of a lever 120 operated by a wire coupling 121 attached to the throttle spindle 9. This wire coupling 121 has a lost motion until it engages a peg 120A integral with lever 120. This arrangement provides enrichment of the fuel/air mixture when the throttle valve 8 is opened.

An alternative form of construction, which provides weakening of the fuel/air mixture when the throttle valve 8 is opened, is illustrated in FIGURE 18, whereby a simple cam 130 on the throttle spindle 9 carries a projection 131 which acts directly upon the undersurface of head 132 of the needle valve 82 against the action of a spring 83A which urges the valve 82 towards its closed position.

Provision for additional enrichment for starting is made via a well 150 provided in the float chamber body 100 (FIGURE 8) and communicating with the float chamber 16 via a drilling 151. The well 150 is ventilated above fuel level by a passage 152 in communication with the top part of fuel chamber 100 and thence with the atmosphere and carries a dip tube 153 which communicates with a passage 154 in the body 1, whence fuel travels via a passage 155 in starter housing 300 (FIGURE 11) into a chamber 156 carrying a seating 157 with a seal 158 supported on a spring 159. The seating 157 contains an orifice 160 which is normally sealed by a needle valve member 161, carrying a seal 162 which is moved under the influence of a cam 163 mounted on a spindle 164 carrying a lever 165 on the outside of the starter housing 300. When the starter is not in use the valve 161 is held on to the seating 157 by means of the cam 163 and operation of lever 165 permits springs 166 to lift said needle valve 161 off seating 157. The lever 165 may be operated by a cable attached to the pin 175 (FIGURE 1). The movement of lever 165 is limited by pin 165A and slot 165B. The lever 165 is connected via a pin 176 in a bell crank 177, a link 178 to a lever 179 in unidirectional driving connection with the throttle spindle 9 via an abutment pin 180 in a lever 181. Said lever 181 is, itself, rigidly connected to the spindle 9. It will thus be clear that operation of the lever 165 by means of a suitable control, not only results in the opening of the fuel passages 155, 156, 160, etc., under the influence of needle valve 161, but also causes the throttle valve 8 to open, thus providing for rapid idling of an engine, for example, in cold weather. Fuel admitted past needle valve 161 in the device above described, enters the annular chamber 200, which it leaves via the passage 201 in the starter body 300 entering chamber 202 in the body 1 (FIGURES 7 and 8) from whence it is admitted by a passage 203 into the chamber 50. Said passage 203 opens into the mixing chamber 50 near the flap valve or vane 3 so that opening of said vane progressively reduces the suction acting on said passage to produce a weakening of the mixture of fuel and air as the airflow increases through opening 2.

It will be appreciated that the movement of piston 31 in the chamber 27 which is filled with fuel, will provide a damping of the movements of vane 3.

An alternative form of damper is shown in FIGURE 19 in which the spindle 4 carries a seal 350 and a disc 351 in a housing 352 formed in the body 1, said housing being enclosed by a cover 353 and a seal 356. The housing may be filled with a viscous fluid for example of the type known as "silicone oil" which is fed into channel 354 and ventilated via channel 355 to ensure complete exclusion of air or vapour; said channels 354 and 355 are plugged after filling.

With the construction of FIGURES 1 to 19 the operation will normally be such that as the throttle valve is opened above idling speed, the suction will decrease over most of the normal range of engine speeds although it will increase as maximum speed is approached. In any construction in accordance with the present invention this decrease of suction will occur if desired over at least a part of normal running speeds of the engine. Preferably this decrease will occur over at least half of the range of speeds from idling to maximum speed.

I claim:

1. A carburettor which comprises, in combination, an air and fuel mixing chamber, air inlet valve means at one end of said chamber opening in response to lower pressure on the downstream side than on the upstream side thereof, resilient means operatively connected with said air inlet valve means for yieldingly opposing the opening thereof, a throttle valve at the other end of said chamber, control means for operating said throttle valve, fuel metering means opening into said fuel mixing chamber, starting fuel feed means distinct from said fuel metering means and opening into said mixing chamber close to said air inlet valve means at a point that is downstream from the latter means when said latter means is closed and upstream from said latter means when said latter means is open, and control means for simultaneously actuating said starting fuel feed means and opening said throttle valve, whereby the air inlet valve means functions both to control the flow of air into said chamber and to control the admission of starting fuel.

2. A carburettor which comprises, in combination, an air and fuel mixing chamber, air inlet valve means at one end of said chamber opening in response to lower pressure on the downstream side than on the upstream side thereof, resilient means operatively connected with said air inlet valve means for yieldingly opposing the opening thereof, a throttle valve at the other end of said chamber, control means for operating said throttle valve, a float chamber for the feed of fuel to said mixing chamber, fuel metering means between said float chamber and said fuel mixing chamber, starting fuel feed means distinct from said fuel metering means and leading from said float chamber to a point of said mixing chamber close to said air inlet valve means and that is downstream from the latter means when said latter means is closed and upstream from said latter means when said latter means is open, and control means for simultaneously and correspondingly operating said starting fuel feed means and opening said throttle valve, whereby the air inlet valve means functions both to control the flow of air into said chamber and to control the admission of starting fuel.

References Cited in the file of this patent
UNITED STATES PATENTS

| | | |
|---|---|---|
| 979,555 | Peterson | Dec. 27, 1910 |
| 1,995,587 | Schuttler | Mar. 26, 1935 |
| 2,071,717 | Winkle | Feb. 23, 1937 |
| 2,205,458 | Ball | June 25, 1940 |
| 2,314,570 | Ball | Mar. 23, 1943 |
| 3,053,240 | Mick | Sept. 11, 1962 |